(12) United States Patent
Oka

(10) Patent No.: US 8,451,506 B2
(45) Date of Patent: May 28, 2013

(54) IMAGE PROCESSING APPARATUS, CONTROL METHOD AND STORAGE MEDIUM

(75) Inventor: Hiroyuki Oka, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 12/899,147

(22) Filed: Oct. 6, 2010

(65) Prior Publication Data

US 2011/0096366 A1    Apr. 28, 2011

(30) Foreign Application Priority Data

Oct. 27, 2009  (JP) ................................. 2009-247108

(51) Int. Cl.
*G06T 5/00* (2006.01)
*G06K 15/00* (2006.01)
*H04N 1/46* (2006.01)

(52) U.S. Cl.
USPC .......................... 358/3.26; 358/1.18; 358/540

(58) Field of Classification Search
USPC ...................... 358/3.26, 1.18, 540; 348/222.1, 348/241; 382/162, 275
See application file for complete search history.

(56) References Cited

U.S. PATENT DOCUMENTS

| 6,720,997 | B1 | 4/2004 | Horie et al. | 348/218.1 |
| 7,587,099 | B2* | 9/2009 | Szeliski et al. | 382/275 |
| 7,990,429 | B2* | 8/2011 | Saito | 348/222.1 |
| 2009/0303544 | A1* | 12/2009 | Kido | 358/1.18 |

FOREIGN PATENT DOCUMENTS

JP    3-984346 B2    10/2007

OTHER PUBLICATIONS

Media Information and Vision Technology in the 21$^{st}$ Century. IEEJ Technical Report No. 981, Investigation Committee on Media Information and Vision Technology, Aug. 30, 2004, pp. 41-45 (English-language translation included)—15 pages.

* cited by examiner

*Primary Examiner* — Charlotte M Baker
(74) *Attorney, Agent, or Firm* — Fitzpatrick, Cella, Harper & Scinto

(57) ABSTRACT

An image processing apparatus which performs processing of applying blur processing to divided image data, and compositing divided images having undergone the blur processing, the apparatus comprises an out of image boundary estimation unit which estimates a pixel out of an image boundary of image data for each of first image data subjected to the blur processing and second image data neighboring the first image data among the divided image data; and a blurring image generation unit which generates blurring image data for the first image data by performing the blur processing using a filter for the first image data while referring to the first image data, the second image data, and an estimation pixel estimated by the out of image boundary estimation unit.

13 Claims, 9 Drawing Sheets

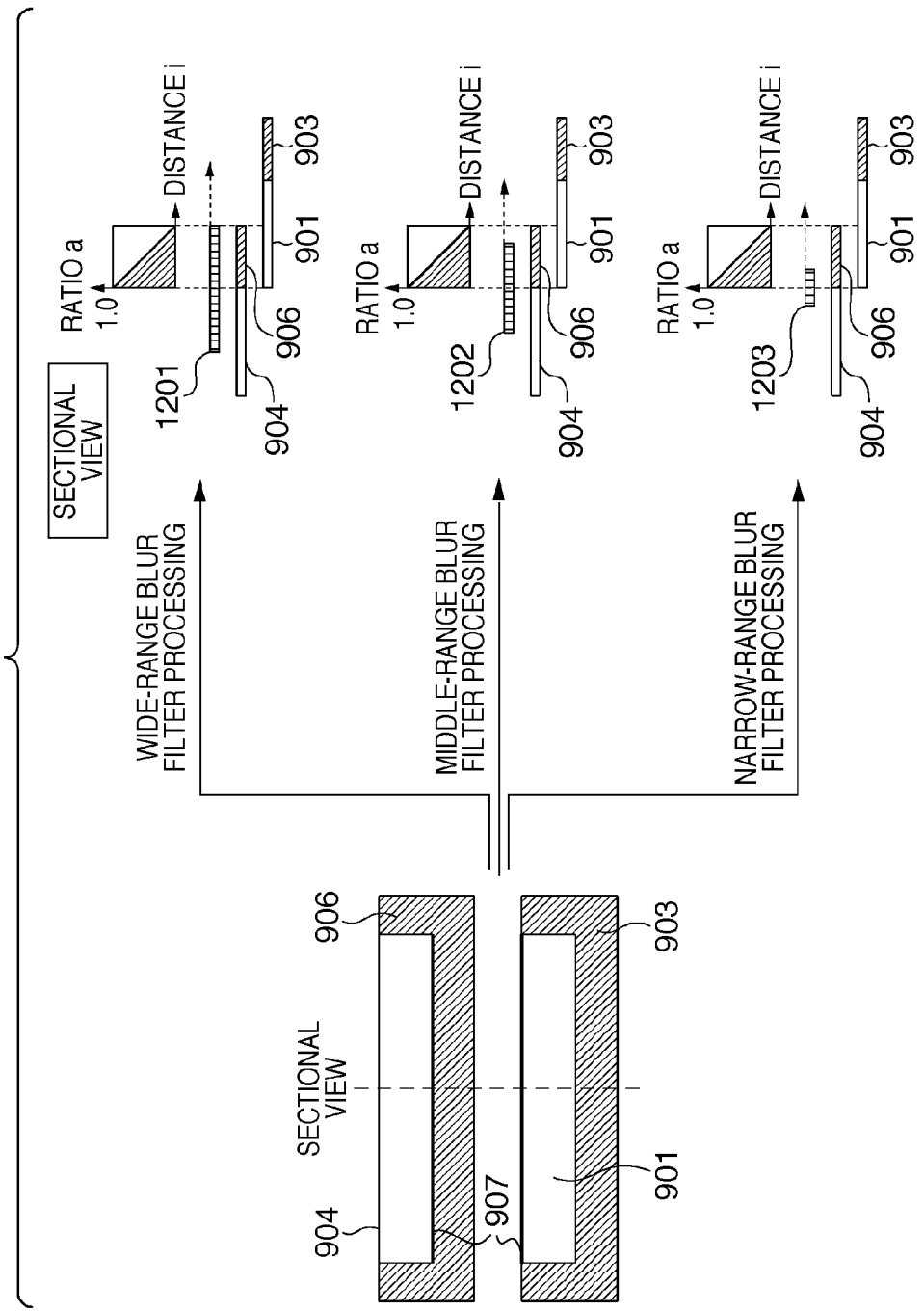

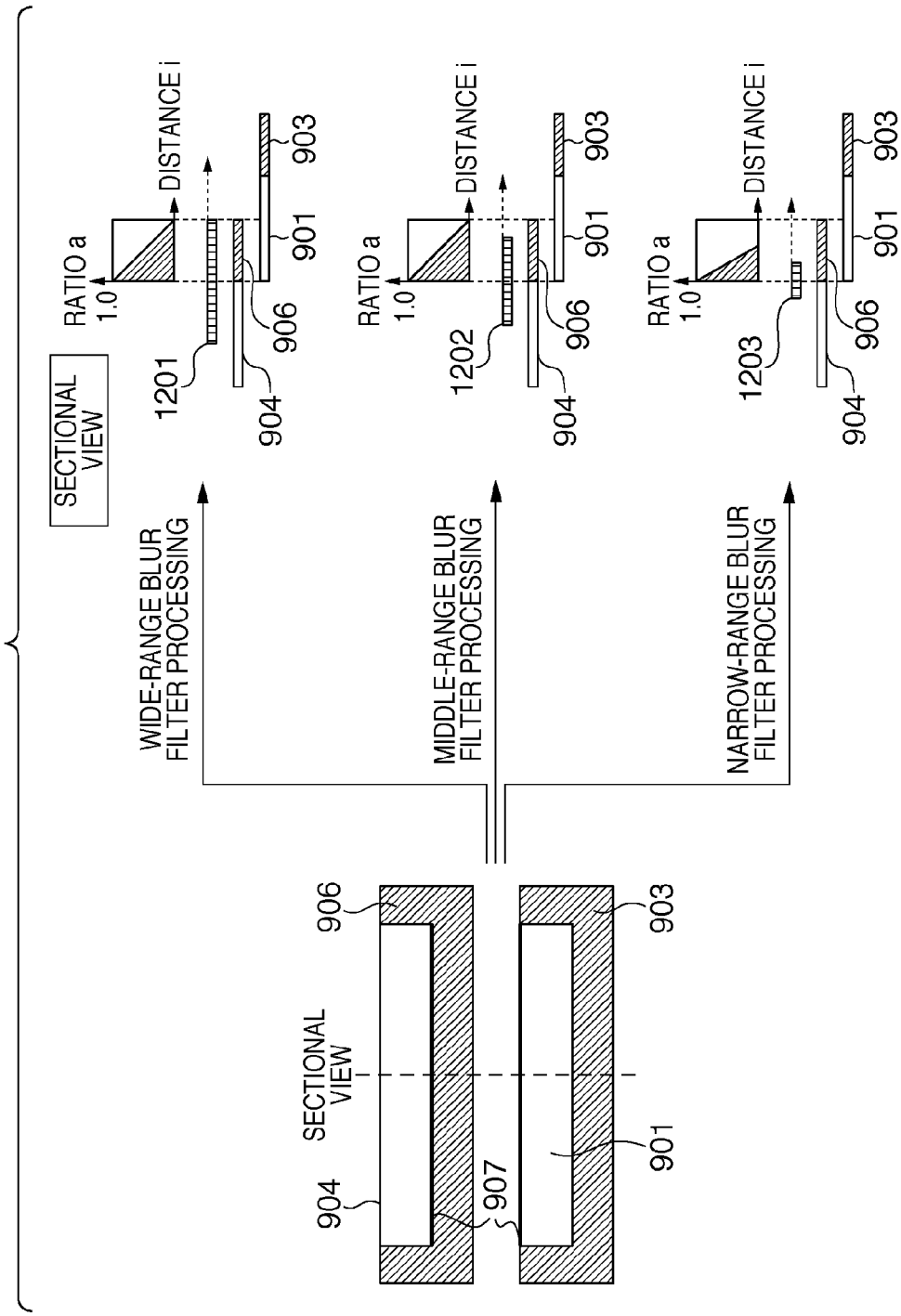

IMAGE PROCESSING APPARATUS, CONTROL METHOD AND STORAGE MEDIUM

BACKGROUND OF THE INVENTION

1. Field of the Invention

The present invention relates to an image processing apparatus, control method, and storage medium. More particularly, the present invention relates to an image processing apparatus and image processing method to generate a blurring image having a blurring effect desirable even when one photographic image is divided into a plurality of regions.

2. Description of the Related Art

Recently, digital image sensing devices such as a digital camera and scanner have prevailed, and a photograph is frequently loaded as electronic data into a computer. The digital photographic image is edited using an application on the computer, and output from an output device such as a display or printer. Before outputting the photographic image from the output device, an image quality degrading factor such as backlight or dark noise generated in the photographic image is often corrected to display the photographic image with better appearance for the viewer.

One correction processing executed for a photographic image is blur processing. Blur processing is used to reduce noise generated in a photographic image. Blur processing is also used to generate an intermediate image when performing local luminance correction (dodging correction) utilizing the retinex theory.

Local luminance correction utilizing the retinex theory will be explained. According to retinex theory, the brightness distribution I of the object one visually perceives is based on a model expressed by multiplying the reflectance distribution R of the object surface by the illumination light distribution L:

$$I = L \cdot R \quad (1)$$

I: brightness distribution of the object
L: illumination light distribution
R: reflectance distribution of the object surface
(see, for example, "Media Information and Vision Technology in the 21st Century", IEEJ Technical Report No. 981, Investigation Committee on Media Information and Vision Technology, pp. 41-45, Aug. 30, 2004).

In the model of the retinex theory, the reflectance distribution R of the object surface is a permanent property specific to the object. Thus, for example, a phenomenal factor such as backlight which localizes the brightness distribution I of the object is regarded to be accounted for not by the reflectance distribution R of the object surface but by the illumination light distribution L. A phenomenon such as backlight can be improved by correcting the illumination light distribution L as long as the brightness distribution I of the object can be extracted from a photographic image and divided into the illumination light distribution L and the reflectance distribution R of the object surface.

A center/surround model is proposed as a model for extracting the illumination light distribution L from the brightness distribution I of the object. The center/surround model assumes that the illumination light distribution L is a macroscopic change of the brightness distribution I of the object. A greatly blurring image is generated by applying a wide-range Gaussian filter to the brightness distribution I of the object. However, this blurring image reproduces neither a gradual brightness change in the object nor object contour in the photographic image. For this reason, middle- and narrow-range Gaussian filters are applied to the brightness distribution I of the object, generating moderately and weakly blurring images. The weakly, moderately, and greatly blurring images are composited at a predetermined ratio, and the resultant image is handled as the image of the illumination light distribution L. In this way, blur processing is an important technique in photographic image correction processing.

In some cases, however, blur processing is not simply applied. For example, when one photographic image is divided into a plurality of partial regions using a computer application, applying blur processing to the respective divided images causes a mismatch such as brightness discontinuity at the joint after recombination. In this case, according to Japanese Patent No. 03984346, blur processing is executed after calculating a weighted average at a portion where pixels overlap each other after division. This can reduce a mismatch such as brightness discontinuity at the joint.

However, an application generally divides an image not to produce a redundant pixel overlapping region. Hence, the method disclosed in Japanese Patent No. 03984346 is rarely applied. When a photographic image is divided into a plurality of regions not to produce a pixel overlapping region, two problems arise if blur processing is simply applied. The first problem is brightness discontinuity at the joint when images are combined again after blur filter processing because the pixels of the respective images are not referred to near the boundary between neighboring divided images in blur filter calculation. The second problem is that part of the blur filter falls outside an image to be processed near the division boundary, failing to obtain a blurring image with a good blurring effect.

SUMMARY OF THE INVENTION

The present invention has been made to solve the above problems, and has as its object to implement blur filter processing capable of obtaining a satisfactory blurring effect without generating a mismatch at the joint even after recombining divided images when a photographic image is divided into a plurality of partial regions.

According to one aspect of the present invention, there is provided an image processing apparatus which performs processing of applying blur processing to divided image data, and compositing divided images having undergone the blur processing, the apparatus comprising: an out of image boundary estimation unit which estimates a pixel out of an image boundary of image data for each of first image data subjected to the blur processing and second image data neighboring the first image data among the divided image data; and a blurring image generation unit which generates blurring image data for the first image data by performing the blur processing using a filter for the first image data while referring to the first image data, the second image data, and an estimation pixel estimated by the out of image boundary estimation unit, wherein the estimation pixel estimated by the out of image boundary estimation unit is a pixel having the same value as a pixel at the image boundary of the image data in each of the first image data and the second image data, and when referring to a pixel at which a pixel of the first image data and an estimation pixel for the second image data overlap each other in the blur processing using the filter for the first image data, as the referred pixel moves apart from a boundary between the first image data and the second image data, the blurring image generation unit gradually reduces a weight of reference to the estimation pixel for the second image data, gradually increases a weight of reference to the pixel of the first image data, calculates a weighted average corresponding to the weights for the pixel of the first image data and the estimation pixel for the second image data, and refers to a calculated value.

According to another aspect of the present invention, there is provided an image processing apparatus which performs processing of applying blur processing to divided image data, and compositing divided images having undergone the blur processing, the apparatus comprising: an out of image boundary estimation unit which estimates a pixel out of an image boundary of image data for each of first image data subjected to the blur processing and second image data neighboring the first image data among the divided image data; a blurring image generation unit which generates a plurality of blurring image data for the first image data by performing a plurality of blur processes for the first image data using a plurality of blur filters different in filter size while referring to the first image data, the second image data, and an estimation pixel estimated by the out of image boundary estimation unit; and an image composition unit which composites a plurality of blurring images generated by the blurring image generation unit at a predetermined ratio, generating one image data, wherein the estimation pixel estimated by the out of image boundary estimation unit is a pixel having the same value as a pixel at the image boundary of the image data in each of the first image data and the second image data, and when referring to a pixel at which a pixel of the first image data and an estimation pixel for the second image data overlap each other in the blur processing using the filter for the first image data, as the referred pixel moves apart from a boundary between the first image data and the second image data, the blurring image generation unit gradually reduces a weight of reference to the estimation pixel for the second image data, gradually increases a weight of reference to the pixel of the first image data, calculates a weighted average corresponding to the weights for the pixel of the first image data and the estimation pixel for the second image data, and refers to a calculated value.

According to another aspect of the present invention, there is provided a method of controlling an image processing apparatus which performs processing of applying blur processing to divided image data, and compositing divided images having undergone the blur processing, the method comprising: an out of image boundary estimation step of causing an out of image boundary estimation unit of the image processing apparatus to estimate a pixel out of an image boundary of image data for each of first image data subjected to the blur processing and second image data neighboring the first image data among the divided image data; and a blurring image generation step of causing a blurring image generation unit of the image processing apparatus to generate blurring image data for the first image data by performing the blur processing using a filter for the first image data while referring to the first image data, the second image data, and an estimation pixel estimated in the out of image boundary estimation step, wherein the estimation pixel estimated in the out of image boundary estimation step is a pixel having the same value as a pixel at the image boundary of the image data in each of the first image data and the second image data, and in the blurring image generation step, when referring to a pixel at which a pixel of the first image data and an estimation pixel for the second image data overlap each other in the blur processing using the filter for the first image data, as the referred pixel moves apart from a boundary between the first image data and the second image data, a weight of reference to the estimation pixel for the second image data is gradually reduced, a weight of reference to the pixel of the first image data is gradually increased, a weighted average corresponding to the weights for the pixel of the first image data and the estimation pixel for the second image data is calculated, and a calculated value is referred to.

According to another aspect of the present invention, there is provided a method of controlling an image processing apparatus which applies blur processing to divided image data, and composites divided images having undergone the blur processing, the method comprising: an out of image boundary estimation step of causing an out of image boundary estimation unit of the image processing apparatus to estimate a pixel out of an image boundary of image data for each of first image data subjected to the blur processing and second image data neighboring the first image data among the divided image data; a blurring image generation step of causing a blurring image generation unit of the image processing apparatus to generate a plurality of blurring image data for the first image data by performing a plurality of blur processes for the first image data using a plurality of blur filters different in filter size while referring to the first image data, the second image data, and an estimation pixel estimated in the out of image boundary estimation step; and an image composition step of causing an image composition unit of the image processing apparatus to composite a plurality of blurring images generated in the blurring image generation step at a predetermined ratio, generating one image data, wherein the estimation pixel estimated in the out of image boundary estimation step is a pixel having the same value as a pixel at the image boundary of the image data in each of the first image data and the second image data, and in the blurring image generation step, when referring to a pixel at which a pixel of the first image data and an estimation pixel for the second image data overlap each other in the blur processing using the filter for the first image data, as the referred pixel moves apart from a boundary between the first image data and the second image data, a weight of reference to the estimation pixel for the second image data is gradually reduced, a weight of reference to the pixel of the first image data is gradually increased, a weighted average corresponding to the weights for the pixel of the first image data and the estimation pixel for the second image data is calculated, and a calculated value is referred to.

The present invention can suppress generation of a pixel value step at the division boundary after filter processing for divided images obtained by dividing a photographic image into a plurality of partial regions. Further, a value close to a filter calculation result obtained when the image is not divided into partial regions can be attained. Estimating a pixel value out of the image boundary and performing filter processing can ensure a sufficient filter area, achieving a satisfactory blurring effect even near the image boundary.

Further features of the present invention will become apparent from the following description of exemplary embodiments (with reference to the attached drawings).

BRIEF DESCRIPTION OF THE DRAWINGS

FIGS. 10A and 10B are views each showing a state in which a blur filter is applied according to the embodiment.

DESCRIPTION OF THE EMBODIMENTS

<First Embodiment>

Embodiments of the present invention will now be described with reference to the accompanying drawings. The first embodiment will exemplify an image processing system in which a printer driver executes local luminance correction for a photographic image, and a printer engine outputs the photographic image. In the first embodiment, blur processing will be described as blur filter processing.

[General Description of Whole System]

Figure 1:
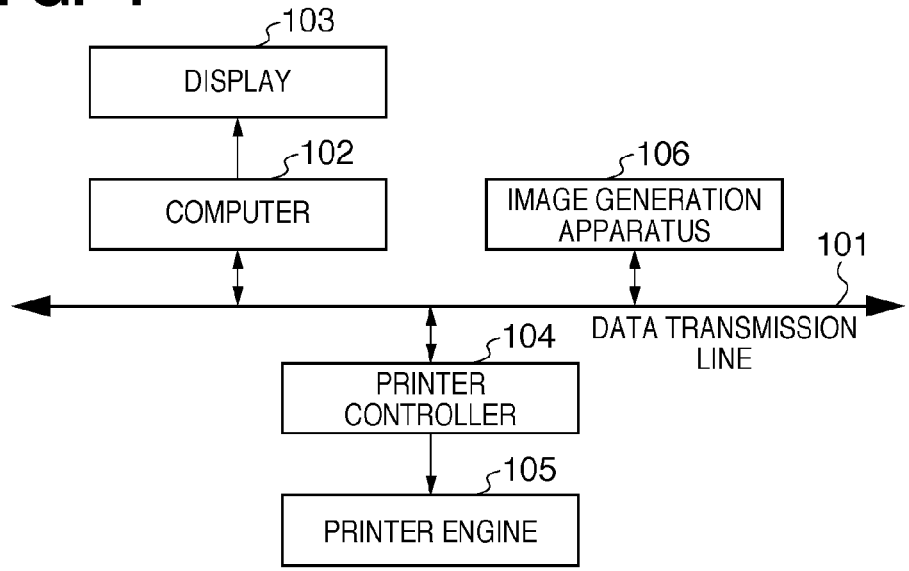
FIG. 1 is a block diagram showing the configuration of an image forming system including an image processing apparatus according to the first embodiment.

FIG. 1 is a block diagram exemplifying the configuration of an image forming system including an image generation apparatus according to the first embodiment of the present invention. The image forming system includes a data transmission line 101, computer 102, display 103, printer controller 104, printer engine 105, and image generation apparatus 106. The computer 102, printer controller 104, and image generation apparatus 106 communicate data with each other via the data transmission line 101. The computer 102 and display 103 are connected to each other. The computer 102 transmits screen information of a running application to the display 103, outputting the screen. The printer controller 104 and printer engine 105 are connected to each other. The printer controller 104 transmits a control signal to the printer engine 105, executing printer output. The image generation apparatus 106 is an image sensing apparatus such as a digital camera, or an image reading apparatus such as a scanner.

Figure 2A:
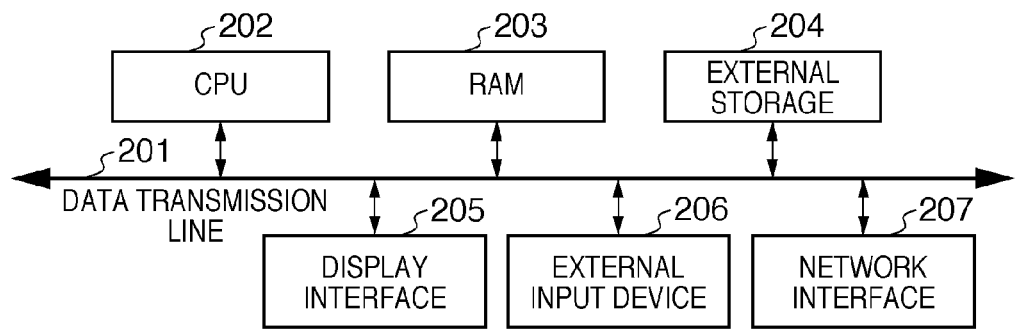
FIGS. 2A and 2B are block diagrams showing physical configurations according to the embodiment.

FIG. 2A is a block diagram showing the physical configuration of the computer 102. The computer 102 includes a data transmission line 201, CPU 202, RAM 203, external storage 204, display interface 205, external input device 206, and network interface 207. The CPU 202, RAM 203, external storage 204, display interface 205, external input device 206, and network interface 207 communicate data with each other via the data transmission line 201. When the computer 102 is activated, the CPU 202 loads an application execution program from the external storage 204, stores it in the RAM 203, and executes it. When the program executed by the CPU 202 reaches a screen display command, the CPU 202 starts transmitting screen display data to the display interface 205, and outputs the screen to the display 103. The CPU 202 monitors user input information via the external input device 206. When user input information is input, the CPU 202 executes processing which corresponds to the user input information and is defined in the program.

Figure 2B:
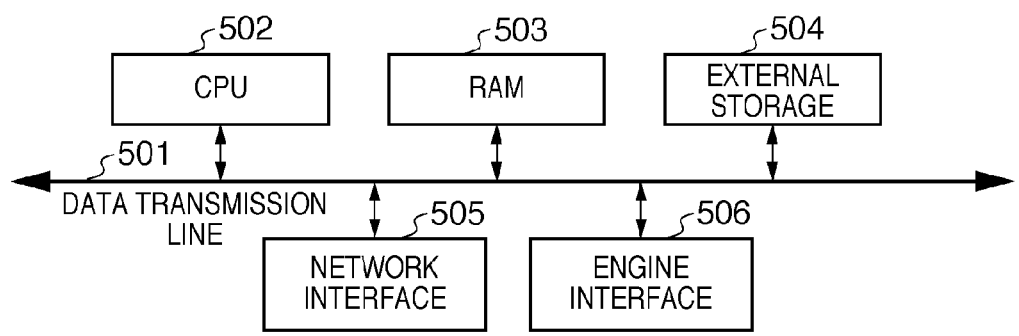

FIG. 2B is a block diagram showing the physical configuration of the printer controller 104. The printer controller 104 includes a data transmission line 501, CPU 502, RAM 503, external storage 504, network interface 505, and engine interface 506. The CPU 502, RAM 503, external storage 504, network interface 505, and engine interface 506 communicate data with each other via the data transmission line 501. When the printer controller 104 is activated, the CPU 502 loads an execution program from the external storage 504, stores it in the RAM 503, and executes it.

Figure 3:
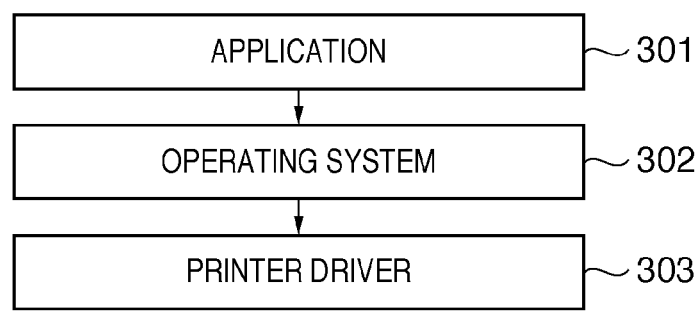
FIG. 3 is a block diagram showing the system configuration of a program according to the embodiment.

FIG. 3 is a block diagram showing the system configuration of a program executed by the CPU 202. An application 301 exchanges information with the user via the display interface 205 or external input device 206, and edits a photographic image stored in the external storage 204. Upon accepting a print command from the user, the application 301 outputs a command to a printer driver 303 via an operating system 302 to render a photographic image and additional text information. Upon receiving the rendering command from the operating system 302, the printer driver 303 generates print data corresponding to the rendering command. Further, the printer driver 303 outputs the print data to the network interface 207, transferring it to the printer controller 104.

Figure 4A:
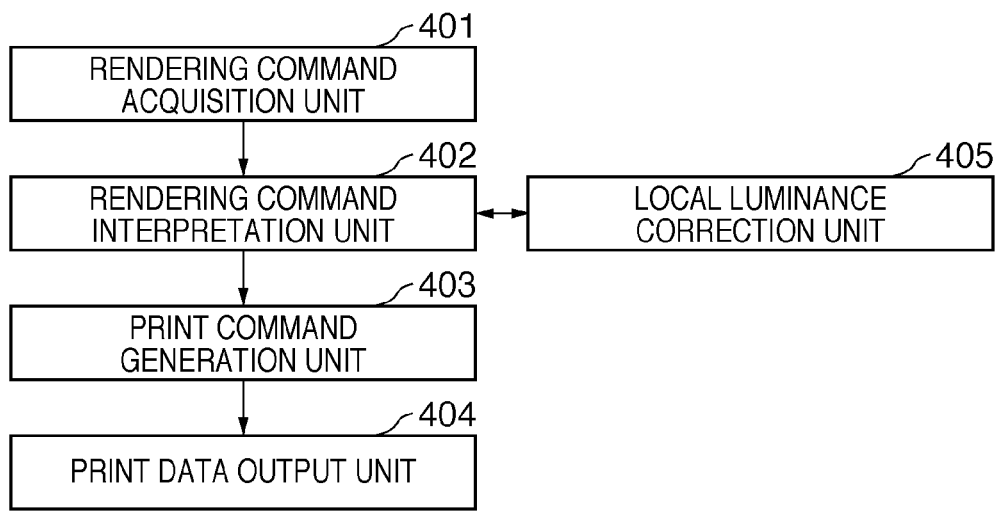
FIGS. 4A and 4B are block diagrams showing module configurations according to the embodiment.

FIG. 4A is a block diagram showing the module configuration of the printer driver 303. The printer driver 303 includes a rendering command acquisition unit 401, rendering command interpretation unit 402, print command generation unit 403, print data output unit 404, and local luminance correction unit 405. The rendering command acquisition unit 401 receives a rendering command from the operating system 302, and transfers it to the rendering command interpretation unit 402. The rendering command interpretation unit 402 determines the type of rendering command received from the rendering command acquisition unit 401. When the type of rendering command indicates text rendering, the rendering command interpretation unit 402 instructs the print command generation unit 403 to generate a text print command. When the type of rendering command indicates image rendering, the rendering command interpretation unit 402 transfers photographic image data to the local luminance correction unit 405 to apply local luminance correction. After that, the rendering command interpretation unit 402 transfers the corrected data to the print command generation unit 403, and instructs the print command generation unit 403 to generate an image print command. The print command generation unit 403 generates a print command in accordance with the print rendering command received from the rendering command interpretation unit 402, and outputs it as print data to the print data output unit 404. At this time, the print command generation unit 403 adds, to the print command, additional information indicating that the image data has already undergone local luminance correction. The print data output unit 404 outputs, to the network interface 207, the print data received from the print command generation unit 403, transmitting the print data to the printer controller 104.

Figure 4B:
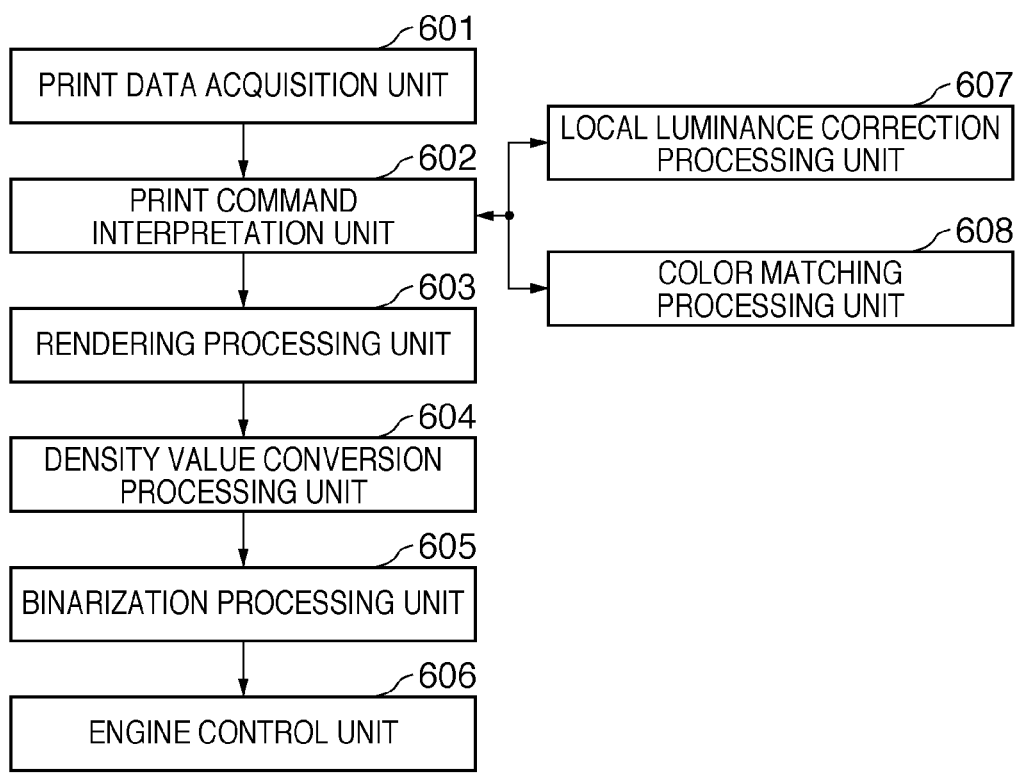

FIG. 4B is a block diagram showing the module configuration of a program executed by the CPU 502. The program includes a print data acquisition unit 601, print command interpretation unit 602, rendering processing unit 603, density value conversion processing unit 604, binarization processing unit 605, engine control unit 606, local luminance correction processing unit 607, and color matching processing unit 608. The print data acquisition unit 601 receives print data which has been received by the network interface 505, and outputs it to the print command interpretation unit 602. The print command interpretation unit 602 switches processing in accordance with the type of print command received from the print data acquisition unit 601. When the print command interpretation unit 602 receives a text print command, it transfers color information of the text to the color matching processing unit 608 to convert the text into a color signal specific to the printer engine 105, and then outputs a rendering command to the rendering processing unit 603. When the print command interpretation unit 602 receives an image print command, it determines whether the image has undergone local luminance correction processing. For print data output from the computer 102, information indicating the completion of local luminance correction processing is added to the print data, so the print command interpretation unit 602 skips the local luminance correction processing unit 607. The print command interpretation unit 602 transfers color information of the image to the color matching processing unit 608 to convert the image into a color signal specific to the printer engine 105, and then outputs a rendering command to the rendering processing unit 603. The rendering processing unit 603 renders data in a 1-page image memory in accordance with the rendering command received from the print command interpretation unit 602. After rendering data corresponding to all rendering commands of a job in progress in the 1-page image memory, the rendering processing unit 603 outputs the image memory data to the density value conversion processing unit 604. The density value conversion processing unit 604 converts the image memory data received from the rendering processing unit 603 into density image data of a color material (for example, ink or toner) handled by the printer engine 105, and outputs the density image data to the binarization processing unit 605. The binarization processing unit 605 converts the density image data into a dot pattern image, and outputs the dot pattern image to the engine control unit 606. The engine control unit 606 outputs a printer engine control command to the engine interface 506 based on the dot pattern image. In response to this, the printer engine 105 forms an image as an ink image or toner image on paper.

[Detailed Description of Local Luminance Correction]

Figure 5:
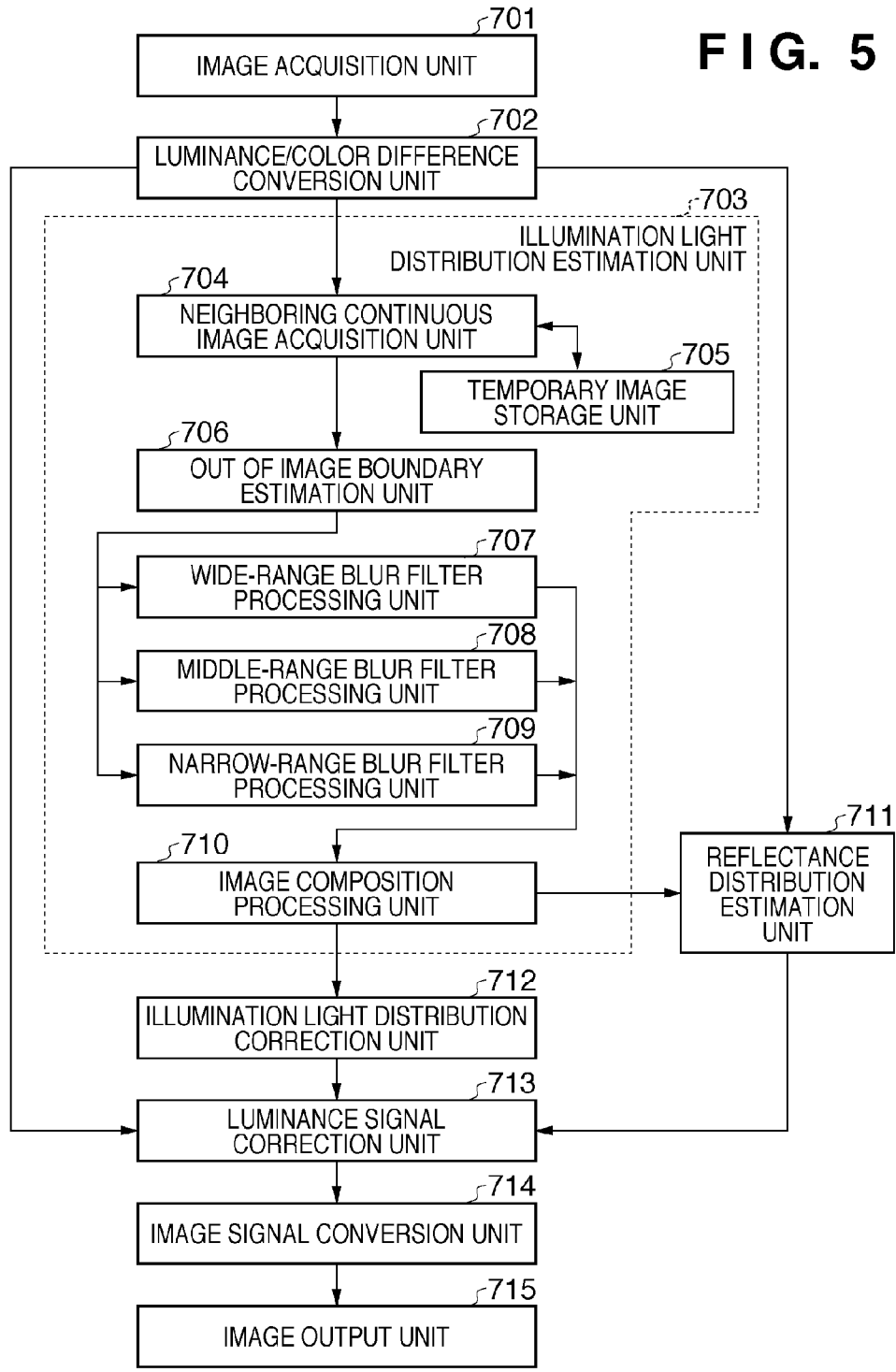
FIG. 5 is a block diagram showing the module configuration of a local luminance correction unit according to the embodiment.

Details of local luminance correction will be described. FIG. 5 is a block diagram showing the module configuration of the local luminance correction unit 405 in the printer driver 303. The local luminance correction unit 405 includes an image acquisition unit 701, luminance/color difference conversion unit 702, illumination light distribution estimation unit 703, reflectance distribution estimation unit 711, illumination light distribution correction unit 712, luminance signal correction unit 713, image signal conversion unit 714, and image output unit 715. The image acquisition unit 701 receives image data from the rendering command interpretation unit 402, and outputs it to the luminance/color difference conversion unit 702. The luminance/color difference conversion unit 702 converts image data into image data in the luminance/color difference signal format. The luminance/color difference signal format is, for example, a YUV signal format in which Y represents a luminance signal, and U and V represent color differences (blue and red components). In general, the signal of image data generated by the printer driver 303 or image generation apparatus 106 often takes the RGB signal format (R: Red, G: Green, and B: Blue). The RGB signal format is converted into the YUV signal format:

$$\begin{pmatrix} Y \\ U \\ V \end{pmatrix} = \begin{pmatrix} 0.299 & 0.587 & 0.114 \\ -0.169 & -0.331 & 0.500 \\ 0.500 & -0.419 & -0.081 \end{pmatrix} \begin{pmatrix} R \\ G \\ B \end{pmatrix} \quad (2)$$

The luminance/color difference conversion unit 702 outputs, to the illumination light distribution estimation unit 703, reflectance distribution estimation unit 711, and luminance signal correction unit 713, image data converted into the YUV signal format. The illumination light distribution estimation unit 703 estimates an illumination light distribution image from the image data by a method to be described later, and outputs it to the reflectance distribution estimation unit 711 and illumination light distribution correction unit 712. The reflectance distribution estimation unit 711 estimates the reflectance distribution R of the object surface based on the retinex theory given by equation (1) using the luminance component of the image data received from the luminance/color difference conversion unit 702 and the illumination light distribution image received from the illumination light distribution estimation unit 703. More specifically, the reflectance distribution estimation unit 711 calculates the reflectance distribution R(i,j) at the pixel (i,j) on the ith row and jth column of image data using the luminance signal distribution I(i,j) (=brightness distribution in the retinex theory) and the illumination light distribution L(i,j):

$$R(i, j) = \frac{I(i, j)}{L(i, j)} \quad (3)$$

The reflectance distribution estimation unit 711 outputs the calculated reflectance distribution image to the luminance signal correction unit 713. The illumination light distribution correction unit 712 corrects the illumination light distribution image received from the illumination light distribution estimation unit 703. In the first embodiment, the illumination light distribution correction unit 712 corrects the illumination light distribution image using, for example, a tone curve for γ=1.2:

$$L'(i, j) = 255 \left( \frac{L(i, j)}{255} \right)^{\gamma} \quad (4)$$

for γ = 1.2

However, the correction method is not limited to this and another correction method is also available.

The illumination light distribution correction unit 712 outputs the corrected illumination light distribution to the luminance signal correction unit 713. The luminance signal correction unit 713 corrects the luminance signal distribution I' received from the luminance/color difference conversion unit 702 based on the retinex theory given by equation (1) using the reflectance distribution R received from the reflectance distribution estimation unit 711 and the corrected illumination light distribution L' received from the illumination light distribution correction unit 712. More specifically, the luminance signal correction unit 713 calculates the corrected luminance signal distribution I'(i,j) (=brightness distribution in the retinex theory) at the pixel (i,j) on the ith row and jth column of image data using the illumination light distribution L(i,j) and the reflectance distribution R(i,j):

$$I'(i,j) = L'(i,j) \cdot R(i,j) \quad (5)$$

The luminance signal correction unit 713 outputs the corrected image data in the luminance/color difference signal format to the image signal conversion unit 714. The image signal conversion unit 714 converts the image data of the luminance/color difference signal received from the luminance signal correction unit into the original signal format of image data received by the image acquisition unit 701. For example, when an image signal received by the image acquisition unit 701 is an RGB color signal, the luminance signal correction unit 713 converts the YUV signal format into the RGB signal format:

$$\begin{pmatrix} R \\ G \\ B \end{pmatrix} = \begin{pmatrix} 1.000 & 0 & 1.402 \\ 1.000 & -0.344 & -0.714 \\ 1.000 & 1.772 & 0 \end{pmatrix} \begin{pmatrix} Y \\ U \\ V \end{pmatrix} \quad (6)$$

The image signal conversion unit 714 outputs the converted image data to the image output unit 715. The image output unit 715 outputs the image data received from the image signal conversion unit 714 to the rendering command interpretation unit 402.

Next, the illumination light distribution estimation unit 703 will be explained in detail. The illumination light distribution estimation unit 703 includes a neighboring continuous image acquisition unit 704, temporary image storage unit 705, out of image boundary estimation unit 706, wide-range blur filter processing unit 707, middle-range blur filter processing unit 708, narrow-range blur filter processing unit 709, and image composition processing unit 710. The neighboring continuous image acquisition unit 704 extracts, from image data in the temporary image storage unit 705, image data continuously neighboring the one received from the luminance/color difference conversion unit 702. Note that image data stored in the temporary image storage unit 705 are those which have already been referred to in local luminance correction and stored by the neighboring continuous image acquisition unit 704 to be described with reference to FIG. 6.

[Neighboring Continuous Image Acquisition Sequence]

Figure 6:
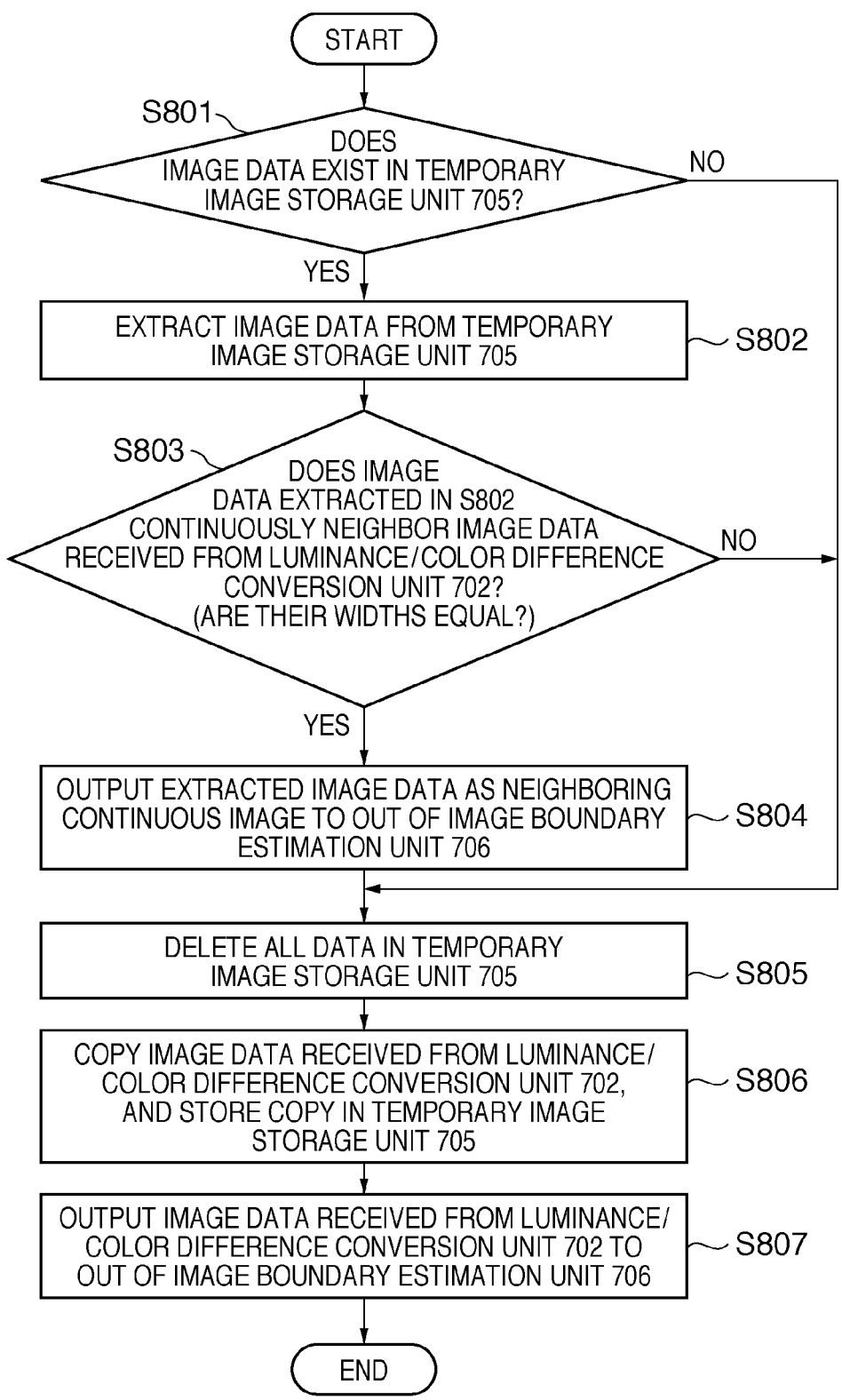
FIG. 6 is a flowchart showing a processing sequence in a neighboring continuous image acquisition unit according to the embodiment.

A processing sequence in the neighboring continuous image acquisition unit 704 will be explained with reference to the flowchart of FIG. 6. A program concerning this sequence in the printer driver 303 is stored in the external storage 204 of the computer 102, read out to the RAM 203, and executed by the CPU 202. In S801, the neighboring continuous image acquisition unit 704 determines whether image data exists in the temporary image storage unit 705. If no image data exists in the temporary image storage unit 705, the process shifts to S805. If image data exists in the temporary image storage unit 705, the neighboring continuous image acquisition unit 704 extracts image data from the temporary image storage unit 705 in S802. In S803, the neighboring continuous image acquisition unit 704 determines whether the extracted image data is neighboring continuous image data positioned immediately before image data received from the luminance/color difference conversion unit 702, by determining whether the widths of these image data are equal. If the widths of these image data are equal, the neighboring continuous image acquisition unit 704 determines that the extracted image data is neighboring continuous image data, and the process shifts to S804. In S804, the neighboring continuous image acquisition unit 704 outputs the neighboring continuous image to the out of image boundary estimation unit 706. If the widths are different, the neighboring continuous image acquisition unit 704 determines that the extracted image data is not neighboring continuous image data, and the process shifts to S805 without any processing. In S805, the neighboring continuous image acquisition unit 704 deletes all image data in the temporary image storage unit 705. Then, in S806, the neighboring continuous image acquisition unit 704 copies the image data received from the luminance/color difference conversion unit 702, and stores the copy in the temporary image storage unit 705. Finally in S807, the neighboring continuous image acquisition unit 704 outputs the image data received from the luminance/color difference conversion unit 702 to the out of image boundary estimation unit 706, ending a series of processes. In this processing sequence, whether image data is continuous is determined using the width of the image data. However, the determination is not limited to this method, and another method is also usable as long as whether divided images are continuous can be determined using, for example, pixel information of a pixel in the image data.

[Estimation of Pixel Out of Image Boundary]

Figure 7:
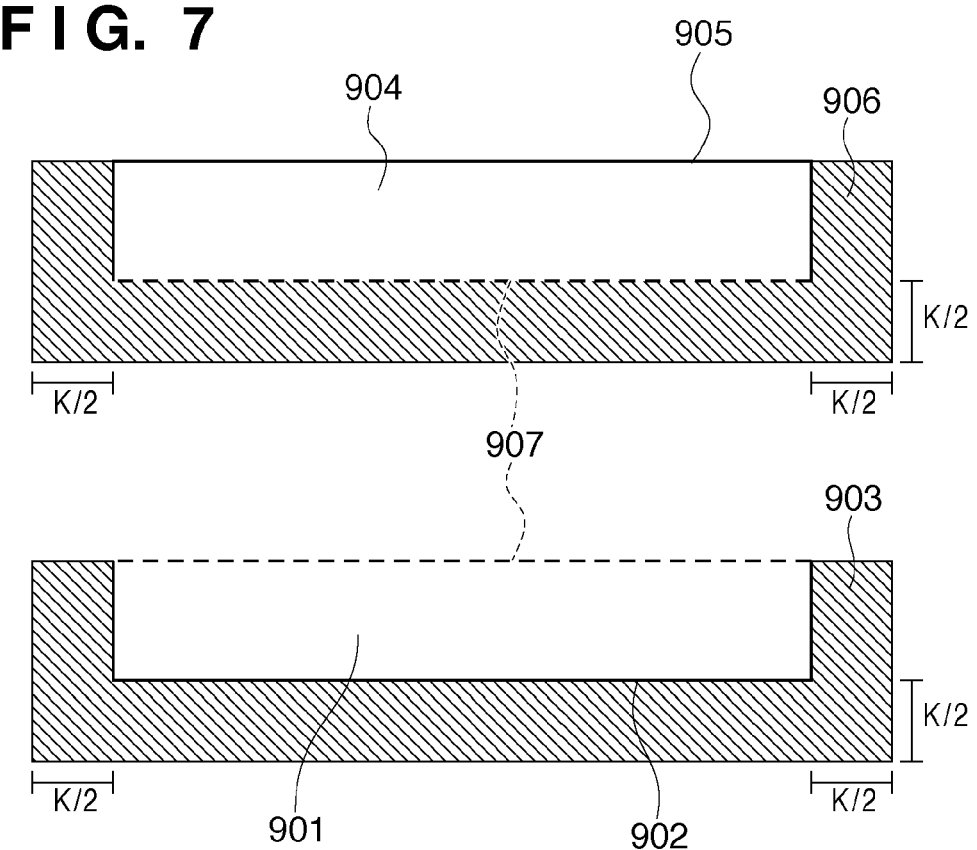
FIG. 7 is a view showing estimation regions out of the image boundaries of an image subjected to local luminance correction and a neighboring continuous image according to the embodiment.

The out of image boundary estimation unit 706 receives image data subjected to local luminance correction, and continuously neighboring image data from the neighboring continuous image acquisition unit 704. The out of image boundary estimation unit 706 then estimates pixel values out of the image boundaries of the respective images. The estimation range contains the size of a blur filter used in blur filter processing by the wide-range blur filter processing unit 707. FIG. 7 shows the respective estimation ranges of pixels out of the image boundaries of image data subjected to local luminance correction and neighboring image data. Image data shown in FIG. 7 include image data 901 whose illumination light distribution is to be obtained, an image boundary 902 and division boundary 907 of the image data 901, and an estimation region 903 of the image data 901. The image data also include image data 904 continuously neighboring the image data 901 whose illumination light distribution is to be obtained, an image boundary 905 and division boundary 907 of the image data 904, and an estimation region 906 of the image data 904. For descriptive convenience, the image data 901 will also be called the first image data, and the image data 904 continuously neighboring the image data 901 will also be called the second image data. Before division, the image data 901 and image data 904 are combined at the division boundary 907. Pixels out of the boundary at the upper end in the image data 901 are not estimated because it suffices to refer to the continuously neighboring image data 904 at the upper end. Pixels out of the boundary at the upper end in the image data 904 are not estimated because even if the image is not divided, this region is not subjected to calculation in blur filter processing. Pixels out of the boundary in this region may be estimated and subjected to calculation in blur filter processing. Letting K be the size of a blur filter used in the wide-range blur filter processing unit 707, the range of the estimation region 903 of the image data 901 and that of the estimation region 906 of the image data 904 are given by a distance of K/2 pixels from the image boundary. Various methods are known as a method of estimating pixels out of the image boundary. In the first embodiment, pixels out of the image boundary are calculated on the premise that the same value as a pixel value at the image boundary continues by propagation. Needless to say, the estimation method is not limited to this, and the estimation region 906 corresponding to the image portion may be estimated using another method. The out of image boundary estimation unit 706 outputs image data obtained by estimating pixels out of the image boundaries of image data and continuously neighboring image data to the wide-range blur filter processing unit 707, middle-range blur filter processing unit 708, and narrow-range blur filter processing unit 709.

Figure 8:
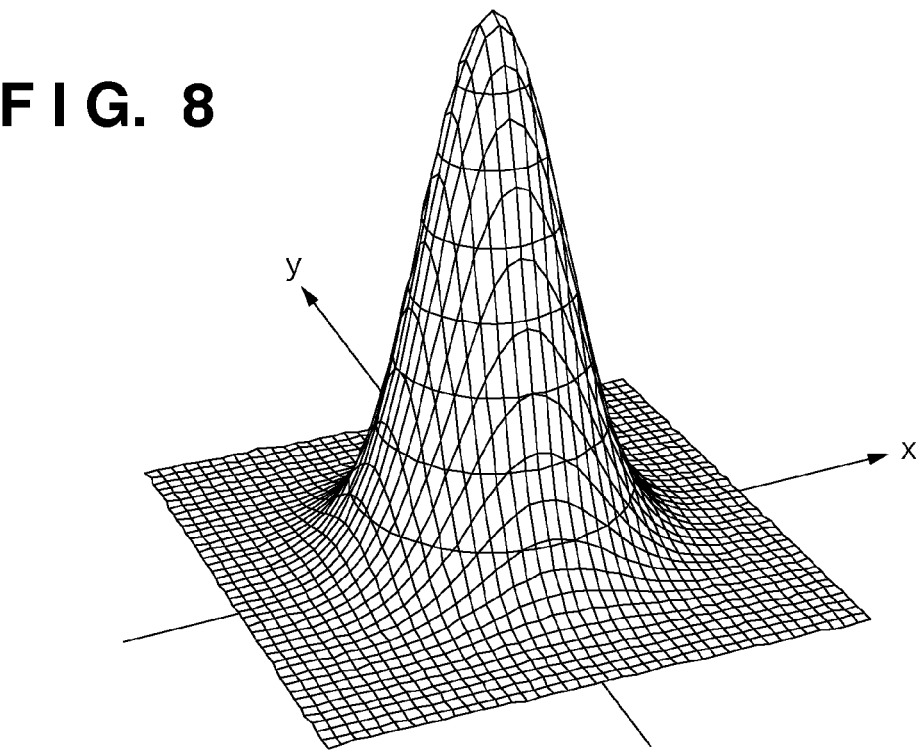
FIG. 8 is a graph showing the two-dimensional spatial distribution of a Gaussian filter according to the embodiment.

The wide-range blur filter processing unit 707, middle-range blur filter processing unit 708, and narrow-range blur filter processing unit 709 execute blur filter processing for the image data while referring to the received image data, neighboring continuous image data, and estimated image data. The blur filter processing units are different in blur filter size. Each processing unit uses a Gaussian filter as a blur filter. The calculation equation Filter(x,y) of the Gaussian filter is given by $$\text{Filter}(p, q) = \text{Const} \times f(i, j) \quad (7)$$

$$\text{Gaussian}(i, j) = \frac{1}{\sqrt{2\pi}} \sigma \exp\left(-\frac{(x^2 + y^2)}{2\sigma^2}\right)$$

where x and y indicate the values of a pixel on the xth row and yth column when the center pixel of the Gaussian filter is defined as the origin. FIG. 8 shows the two-dimensional spatial distribution of the Gaussian filter. The Gaussian(x,y) value in the Gaussian filter ranges from 0 to 1.0. To increase the calculation efficiency by conversion into an integer, Filter (x,y) multiplied by Const is used as an actual blur filter. The Const value is, for example, 216 (=65536) in the first embodiment, but is arbitrary. When actually executing blur filter processing, equation (7) is not solved in every blur filter processing, but a K×K matrix memory is prepared and stores the calculation result Filter(p,q). This K means the above-mentioned blur filter size. K is set to a trouble-free value even when the blur filter value is ignored. To obtain the blurring effect in a wide range by the wide-range blur filter processing unit 707, a matrix memory with a large K value is prepared, the σ value is increased (for example, K=800 and σ=300 in the first embodiment), and Filter(p,q) in equation (7) is calculated. To obtain the blurring effect in a narrow range by the narrow-range blur filter processing unit 709, a matrix memory with a small K value is prepared, the σ value in equation (7) is decreased (for example, K=60 and σ=20 in the first embodiment), and Filter(p,q) in equation (7) is calculated. The middle-range blur filter processing unit 708 adopts, for example, K=200 and σ=80 in the first embodiment.

[Blur Filter Processing]

A blur filter processing sequence in the wide-range blur filter processing unit 707, middle-range blur filter processing unit 708, and narrow-range blur filter processing unit 709 will be explained with reference to the flowchart of FIG. 9. A program concerning this sequence in the printer driver 303 is stored in the external storage 204 of the computer 102, read out to the RAM 203, and executed by the CPU 202. In S1101, i is defined as the coordinate of the center pixel (pixel of interest) in the vertical direction in the blur filter (origin is the upper left corner of the image data 901), and is initialized to 1. In S1102, it is determined whether i is equal to or smaller than the height (vertical size of the image data) of the image data. If i is larger than the height of the image data, the process ends. If i is equal to or smaller than the height of the image data, the process advances to S1103. In S1103, the reference ratio of estimation pixels to actual pixels is determined by a predetermined calculation method in a region where the actual pixels of image data subjected to local luminance correction and the estimation pixels of neighboring continuous image data overlap each other. When this ratio is defined as "a: (1−a)", the ratio a is determined in the first embodiment:

$$a = \begin{cases} 1 - \frac{K/2 - i}{K/2} & (1 < i < K/2) \\ 0 & (i > K/2) \end{cases} \quad (8)$$

Equation (8) means that the value of the ratio a increases as the center pixel moves apart from the image boundary (as i increases). An equation to obtain the ratio a may be different from equation (8) as long as the ratio a increases for a larger i. From equation (8), when the center pixel moves apart from the image boundary by half or more the blur filter size, the ratio a becomes 0, and blur filter processing is executed without referring to any estimation pixel. In S1104, j is defined as the coordinate of the center pixel (pixel of interest) in the horizontal direction in the blur filter (origin is the upper left corner of the image data 901), and is initialized to 1. In S1105, it is determined whether j is equal to or smaller than the width (horizontal size of the image data) of the image data. If j is larger than the width of the image data, the process advances to S1108 to increment the variable i by one, and is looped back to S1102. If j is equal to or smaller than the width of the image data, the process advances to S1106 to execute blur filter processing using the pixel (i,j) as the pixel of interest. The calculation equation Filtering(i,j) in the blur filter processing is given by $$\text{Filtering}(i, j) = \frac{\sum_{q=-K}^{K} \sum_{p=-K}^{K} \text{Filter}(p, q) \text{Value}(i+p, i+q)}{\sum_{q=-K}^{K} \sum_{p=-K}^{K} \text{Filter}(p, q)} \quad (9)$$

$$\text{Value}(x, y) = \begin{cases} I_{Serial}(x, y) & (x, y \in I_{Serial} \cap x, y \notin I_{Current}) \\ I_{Current}(x, y) & (x, y \notin I_{Serial} \cap x, y \in I_{Current}) \\ (1-a)I_{Serial}(x, y) + aI_{Current}(x, y) & (x, y \in I_{Serial} \cap x, y \in I_{Current}) \end{cases}$$

where Filter(p,q) is the Gaussian filter calculated in equation (7), $I_{Current}(x)$ is a pixel value belonging to image data subjected to local luminance correction, $I_{Serial}(x, y)$ is the pixel value of neighboring continuous image data, and Value(x,y) is a pixel value referred to by the blur filter. x,y ∈ $I_{Serial}$ ∩ x, y ∈ $I_{Current}$ represents a region where the actual pixels of the image data subjected to local luminance correction and the estimation pixels of the neighboring continuous image data overlap each other. In the region where the actual pixels and estimation pixels overlap each other, the weighted average is calculated based on the ratio a calculated by equation (8). As a result, a value to be referred to for each pixel is obtained in accordance with equation (9).

Upon completion of blur filter processing based on equation (9), the process advances to S1107. In S1107, the variable j is incremented by one, and the process is looped back to S1105.

Figure 9:
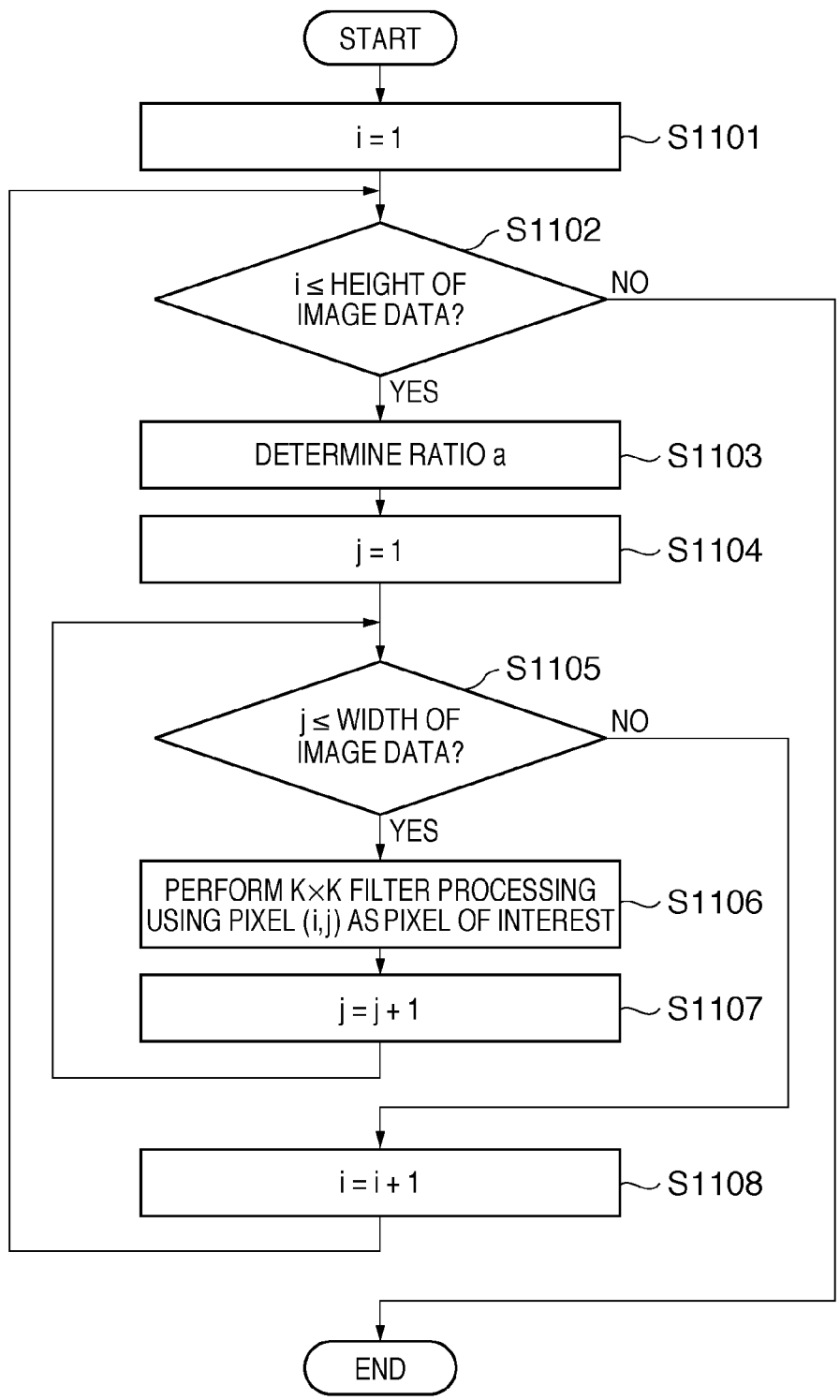
FIG. 9 is a flowchart showing a processing sequence in a blur filter processing unit according to the embodiment.

The wide-range blur filter processing unit 707, middle-range blur filter processing unit 708, and narrow-range blur filter processing unit 709 generate blurring images according to the processing sequence of FIG. 9, respectively, and output them to the image composition processing unit 710.

The image composition processing unit 710 composites the three blurring images, generating an illumination light distribution having a feature "macroscopic luminance distribution in which a small luminance change is blurred while leaving the object contour", which is necessary in local luminance correction. In the first embodiment, the image composition processing unit 710 composites blurring images by, for example, calculating the weighted average of the pixel values in accordance with equation (10) though an equation other than equation (10) is also available:

$$L(i, j) = \frac{\text{Filtering}_s(i, j) + \text{Filtering}_m(i, j) + 2\text{Filtering}_l(i, j)}{4} \quad (10)$$

where $\text{Filtering}_l$, $\text{Filtering}_m$, and $\text{Filtering}_s$ are a blurring image generated by the wide-range blur filter processing unit 707, a blurring image generated by the middle-range blur filter processing unit 708, and a blurring image generated by the narrow-range blur filter processing unit 709, respectively, and L(i,j) is an illumination light distribution image obtained by compositing the three blurring images.

The state of image processing according to the flowchart shown in FIG. 9 will be explained with reference to FIG. 10A. Three types of blur filter processes are executed for the image data 901 whose illumination light distribution is to be obtained, the estimation region 903 of the image data 901, the image data 904 neighboring the image data, and the estimation region 906 of the image data 904. Sectional views on the right side show processing states. As is apparent from these sectional views, the estimation region 906 and image data 901 overlap each other. Hence, when applying blur filters 1201, 1202, and 1203, normal blur filter calculation is done in a region where image data do not overlap each other. However, the weighted average is calculated in the region where the estimation region 906 and image data 901 overlap each other. At this time, the weight ratio a is calculated based on equation (8) using the distance i between the center pixel of the blur filter and the division boundary 907. As the blur filter moves apart from the division boundary 907, the weight of the estimation region 906 decreases gradually, and that of the image data 901 whose illumination light distribution is to be obtained increases gradually. In the first embodiment, three processes are executed as blur filter processing for wide, middle, and narrow ranges, but blur filter processing is not limited to this and the number of filters may be increased/decreased, as needed. At this time, the feature "macroscopic luminance distribution in which a small luminance change is blurred while leaving the object contour", which is implemented by equation (10), also needs to be taken into consideration.

As described above, according to the first embodiment, when the blur filter falls outside the boundary of image data, pixel values out of the image boundary are estimated to execute blur filter processing. A sufficient blur filter area can therefore be ensured, obtaining a satisfactory blurring effect even near the image boundary. Further, blur filter processing is performed for image data while referring to original data of neighboring image data having undergone the blur filter processing, and estimation pixels out of the image. This can suppress generation of a pixel value step at the division boundary after blur filter processing for divided images obtained by dividing a photographic image into a plurality of partial regions. In a region where image data subjected to blur filter processing and estimation pixels out of the image of neighboring image data having undergone blur filter processing overlap each other, the ratio of estimation pixels in blur filter processing is decreased as the center pixel moves apart from the image boundary. As a result, a value close to a blur filter calculation result obtained when the image is not divided into partial regions can be attained.

<Second Embodiment>

In the first embodiment, the wide-range blur filter processing unit 707, middle-range blur filter processing unit 708, and narrow-range blur filter processing unit 709 adopt the same method to calculate the weight ratio a of the actual pixels of image data subjected to local luminance correction and the estimation pixels of neighboring continuous image data.

In the second embodiment, unlike the first embodiment, the calculation method of the ratio a is switched in accordance with the type of blur filter processing. A narrow-range blur filter processing unit 709 calculates the ratio a to become smaller as the center pixel moves apart from the division boundary. In contrast, a wide-range blur filter processing unit 707 and middle-range blur filter processing unit 708 calculate the ratio a to gradually decrease, in order to suppress generation of a step near the division boundary in the illumination light distribution after blur filter processing. An example of calculating the ratio a is $$a = \begin{cases} 1 - \dfrac{K/2 - b \cdot i}{K/2} & (1 < (b \cdot i) < K/2) \\ 0 & (i > (b \cdot i) < K/2) \end{cases} \quad (11)$$

where $$b = \begin{cases} 1 & \text{(wide – or middle – range blur filter } procesing \text{ unit)} \\ 2 & \text{(narrow – range blur filter } procesing \text{ unit)} \end{cases}$$

The state of image processing according to the flowchart of FIG. 9 in the second embodiment will be explained with reference to FIG. 10B. Three types of blur filter processes are executed for image data 901 whose illumination light distribution is to be obtained, an estimation region 903 of the image data 901, image data 904 neighboring the image data, and an estimation region 906 of the image data 904. Sectional views on the right side show processing states. These sectional views reveal that the estimation region 906 and image data 901 overlap each other. Thus, when applying blur filters 1201, 1202, and 1203, normal blur filter calculation is done in a region where image data do not overlap each other. However, the weighted average is calculated in the region where the estimation region 906 and image data 901 overlap each other. The weight ratio a is calculated based on equation (11) using the distance i between the center pixel of the blur filter and a division boundary 907. At this time, the ratio a in the narrow-range blur filter processing unit 709 is calculated to decrease more quickly than the ratios a in the wide-range blur filter processing unit 707 and middle-range blur filter processing unit 708.

According to the second embodiment, the value of the ratio a is decreased quickly as the center pixel moves apart from the division boundary in blur filter processing by the narrow-range blur filter processing unit. Thus, an edge, estimation of which is difficult in the estimation region, can be extracted from actual pixels. In addition to the effects of the first embodiment, an illumination light distribution image after compositing blurring images can maintain the object contour, obtaining a more desirable illumination light distribution as the retinex.

<Third Embodiment>

In the first and second embodiments, the printer driver 303 internally executes local luminance correction. To the contrary, the third embodiment will exemplify an image processing system in which a printer controller 104 internally performs local luminance correction.

In FIG. 4B showing the module configuration of a program executed by a CPU 502 in the printer controller 104, a print command interpretation unit 602 interprets the type of print command received from a print data acquisition unit. When the print command interpretation unit 602 determines that the received print command is an image print command, it determines whether the image is image data having undergone local luminance correction processing. When data during processing is print data output from a computer 102, information indicating the completion of local luminance correction processing is added to the print data, so the print command interpretation unit 602 skips a local luminance correction processing unit 607 in order to prevent double local luminance correction. When data during processing is print data output from an image generation apparatus 106, information indicating the completion of local luminance correction processing is not added to the print data. Thus, the print command interpretation unit 602 transfers the image data to the local luminance correction processing unit 607 to execute local luminance correction. Processing by the local luminance correction processing unit 607 is the same as that by a local luminance correction unit 405 in a printer driver 303. After executing local luminance correction for the image data, the local luminance correction processing unit 607 outputs the image data to the print command interpretation unit 602. The print command interpretation unit 602 transfers color information of the image to a color matching processing unit 608 to convert the image into a color signal specific to a printer engine 105. Then, the print command interpretation unit 602 outputs the image data and a rendering command to a rendering processing unit 603. Subsequent processing is the same as that described with reference to FIG. 4B in the first embodiment.

According to the third embodiment, in addition to the effects of the first and second embodiments, the printer controller can execute local luminance correction for uncorrected image data while preventing double local luminance correction for the same image data.

In the above-described embodiments, local luminance correction is executed for the luminance signal of image data. However, the signal of image data is arbitrary, and local luminance correction may be done for, for example, each color signal of RGB image data. The above embodiments adopt blur filter processing using a Gaussian filter. However, the blur filter is arbitrary as long as it has a blurring effect, and blur filter processing may be performed using, for example, a blur filter having a constant value.

<Other Embodiments>

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-247108, filed Oct. 27, 2009, which is hereby incorporated by reference herein in its entirety.

What is claimed is:

1. An image processing apparatus which performs processing of applying blur processing to divided image data, and compositing divided images having undergone the blur processing, the apparatus comprising:
an out of image boundary estimation unit which estimates a pixel out of an image boundary of image data for each of first image data subjected to the blur processing and second image data neighboring the first image data among the divided image data; and
a blurring image generation unit which generates blurring image data for the first image data by performing the blur processing using a filter for the first image data while referring to the first image data, the second image data, and an estimation pixel estimated by said out of image boundary estimation unit, wherein
the estimation pixel estimated by said out of image boundary estimation unit is a pixel having the same value as a pixel at the image boundary of the image data in each of the first image data and the second image data, and
when referring to a pixel at which a pixel of the first image data and an estimation pixel for the second image data overlap each other in the blur processing using the filter for the first image data, as the referred pixel moves apart from a boundary between the first image data and the second image data, said blurring image generation unit gradually reduces a weight of reference to the estimation pixel for the second image data, gradually increases a weight of reference to the pixel of the first image data, calculates a weighted average corresponding to the weights for the pixel of the first image data and the estimation pixel for the second image data, and refers to a calculated value.

2. The apparatus according to claim 1, further comprising a neighboring continuous image acquisition unit which acquires the first image data and the second image data, wherein
said neighboring continuous image acquisition unit determines, based on pixel information and additional information added to the divided image data, whether the divided image data are neighboring continuous image data, and
when the divided image data are neighboring continuous image data, said out of image boundary estimation unit and said blurring image generation unit are applied to the divided image data as the first image data and the second image data.

3. The apparatus according to claim 1, wherein the blur processing in said blurring image generation unit is processing using a Gaussian filter.

4. The apparatus according to claim 1, wherein said blurring image generation unit uses blur filters different in application size in the blur processing for the image data.

5. The apparatus according to claim 4, wherein said blurring image generation unit determines a weight ratio of the estimation pixel in accordance with a type of the blur filter.

6. An image processing apparatus which performs processing of applying blur processing to divided image data, and compositing divided images having undergone the blur processing, the apparatus comprising:
an out of image boundary estimation unit which estimates a pixel out of an image boundary of image data for each of first image data subjected to the blur processing and second image data neighboring the first image data among the divided image data;
a blurring image generation unit which generates a plurality of blurring image data for the first image data by performing a plurality of blur processes for the first image data using a plurality of blur filters different in filter size while referring to the first image data, the second image data, and an estimation pixel estimated by said out of image boundary estimation unit; and
an image composition unit which composites a plurality of blurring images generated by said blurring image generation unit at a predetermined ratio, generating one image data, wherein
the estimation pixel estimated by said out of image boundary estimation unit is a pixel having the same value as a pixel at the image boundary of the image data in each of the first image data and the second image data, and when referring to a pixel at which a pixel of the first image data and an estimation pixel for the second image data overlap each other in the blur processing using the filter for the first image data, as the referred pixel moves apart from a boundary between the first image data and the second image data, said blurring image generation unit gradually reduces a weight of reference to the estimation pixel for the second image data, gradually increases a weight of reference to the pixel of the first image data, calculates a weighted average corresponding to the weights for the pixel of the first image data and the estimation pixel for the second image data, and refers to a calculated value.

7. The apparatus according to claim 6, further comprising a neighboring continuous image acquisition unit which acquires the first image data and the second image data, wherein said neighboring continuous image acquisition unit determines, based on pixel information and additional information added to the divided image data, whether the divided image data are neighboring continuous image data, and when the divided image data are neighboring continuous image data, said out of image boundary estimation unit and said blurring image generation unit are applied to the divided image data as the first image data and the second image data.

8. The apparatus according to claim 6, wherein the blur processing in said blurring image generation unit is processing using a Gaussian filter.

9. The apparatus according to claim 6, wherein when referring to a pixel at which a pixel of the first image data and an estimation pixel of the second image data overlap each other, said blurring image generation unit determines a method of calculating the weight for the estimation pixel of the second image data and the weight for the pixel of the first image data, among predetermined calculation methods in accordance with types of blur filters used in the plurality of blur processes, and generates an image.

10. A method of controlling an image processing apparatus which performs processing of applying blur processing to divided image data, and compositing divided images having undergone the blur processing, the method comprising:

an out of image boundary estimation step of causing an out of image boundary estimation unit of the image processing apparatus to estimate a pixel out of an image boundary of image data for each of first image data subjected to the blur processing and second image data neighboring the first image data among the divided image data; and a blurring image generation step of causing a blurring image generation unit of the image processing apparatus to generate blurring image data for the first image data by performing the blur processing using a filter for the first image data while referring to the first image data, the second image data, and an estimation pixel estimated in said out of image boundary estimation step, wherein the estimation pixel estimated in said out of image boundary estimation step is a pixel having the same value as a pixel at the image boundary of the image data in each of the first image data and the second image data, and in said blurring image generation step, when referring to a pixel at which a pixel of the first image data and an estimation pixel for the second image data overlap each other in the blur processing using the filter for the first image data, as the referred pixel moves apart from a boundary between the first image data and the second image data, a weight of reference to the estimation pixel for the second image data is gradually reduced, a weight of reference to the pixel of the first image data is gradually increased, a weighted average corresponding to the weights for the pixel of the first image data and the estimation pixel for the second image data is calculated, and a calculated value is referred to.

11. A method of controlling an image processing apparatus which applies blur processing to divided image data, and composites divided images having undergone the blur processing, the method comprising:

an out of image boundary estimation step of causing an out of image boundary estimation unit of the image processing apparatus to estimate a pixel out of an image boundary of image data for each of first image data subjected to the blur processing and second image data neighboring the first image data among the divided image data;

a blurring image generation step of causing a blurring image generation unit of the image processing apparatus to generate a plurality of blurring image data for the first image data by performing a plurality of blur processes for the first image data using a plurality of blur filters different in filter size while referring to the first image data, the second image data, and an estimation pixel estimated in said out of image boundary estimation step; and an image composition step of causing an image composition unit of the image processing apparatus to composite a plurality of blurring images generated in said blurring image generation step at a predetermined ratio, generating one image data, wherein the estimation pixel estimated in said out of image boundary estimation step is a pixel having the same value as a pixel at the image boundary of the image data in each of the first image data and the second image data, and in said blurring image generation step, when referring to a pixel at which a pixel of the first image data and an estimation pixel for the second image data overlap each other in the blur processing using the filter for the first image data, as the referred pixel moves apart from a boundary between the first image data and the second image data, a weight of reference to the estimation pixel for the second image data is gradually reduced, a weight of reference to the pixel of the first image data is gradually increased, a weighted average corresponding to the weights for the pixel of the first image data and the estimation pixel for the second image data is calculated, and a calculated value is referred to.

12. A non-transitory computer-readable storage medium storing a program for causing a computer to function as an out of image boundary estimation unit which estimates a pixel out of an image boundary of image data for each of first image data subjected to blur processing and second image data neighboring the first image data among divided image data, and a blurring image generation unit which generates blurring image data for the first image data by performing the blur processing using a filter for the first image data while referring to the first image data, the second image data, and an estimation pixel estimated by said out of image boundary estimation unit, wherein the estimation pixel estimated by said out of image boundary estimation unit is a pixel having the same value as a pixel at the image boundary of the image data in each of the first image data and the second image data, and when referring to a pixel at which a pixel of the first image data and an estimation pixel for the second image data overlap each other in the blur processing using the filter for the first image data, as the referred pixel moves apart from a boundary between the first image data and the second image data, said blurring image generation unit gradually reduces a weight of reference to the estimation pixel for the second image data, gradually increases a weight of reference to the pixel of the first image data, calculates a weighted average corresponding to the weights for the pixel of the first image data and the estimation pixel for the second image data, and refers to a calculated value.

13. A non-transitory computer-readable storage medium storing a program for causing a computer to function as an out of image boundary estimation unit which estimates a pixel out of an image boundary of image data for each of first image data subjected to blur processing and second image data neighboring the first image data among divided image data, a blurring image generation unit which generates a plurality of blurring image data for the first image data by performing a plurality of blur processes using a plurality of blur filters different in filter size while referring to the first image data, the second image data, and an estimation pixel estimated by said out of image boundary estimation unit, and an image composition unit which composites a plurality of blurring images generated by said blurring image generation unit at a predetermined ratio, generating one image data, wherein the estimation pixel estimated by said out of image boundary estimation unit is a pixel having the same value as a pixel at the image boundary of the image data in each of the first image data and the second image data, and when referring to a pixel at which a pixel of the first image data and an estimation pixel for the second image data overlap each other in the blur processing using the filter for the first image data, as the referred pixel moves apart from a boundary between the first image data and the second image data, said blurring image generation unit gradually reduces a weight of reference to the estimation pixel for the second image data, gradually increases a weight of reference to the pixel of the first image data, calculates a weighted average corresponding to the weights for the pixel of the first image data and the estimation pixel for the second image data, and refers to a calculated value.

\* \* \* \* \*